Patented Mar. 19, 1935

1,994,599

UNITED STATES PATENT OFFICE 1,994,599

PROCESS FOR CHANGING THE SOLUBILITY OF CELLULOSE ACETATE

Charles S. Webber and Cyril J. Staud, Rochester, N. Y., assignors to Eastman Kodak Company, Rochester, N. Y., a corporation of New York No Drawing. Application September 26, 1929, Serial No. 395,453

9 Claims. (Cl. 260—102)

This invention relates to a process for the hydrolysis of cellulose esters and particularly to the hydrolysis of chloroform soluble cellulose acetate to acetone solubility.

There are a great number of known methods for the preparation of cellulose acetate to the fully acetylated ester, the triacetate, and there are equally as many processes for the hydrolysis of this triacetate of cellulose which is generally designated as chloroform soluble cellulose acetate to a solubility in acetone or other solvent. This hydrolysis is generally carried out in a solution of acetic acid as such a solution results when cellulose triacetate is synthesized by the acetylation of cellulose in an acetic anhydride-acetic acid bath containing a suitable catalyst. Water is generally added to this bath, to stop further acetylation of the cellulose, together with a hydrolytic catalyst, such as strong mineral acids, acid salts and the like; the resulting solution being maintained at a temperature of approximately 50° C. with the production of the acetone soluble variety of the cellulose acetate in a matter of 18 to 48 hours. The cellulose acetate is separated from the by-products of the reaction by precipitation thereof in water.

Cellulose acetate, when thus prepared, while suitable for many purposes in which the color of the cellulose acetate is not of prime importance, is not, however, the best type of cellulose acetate for use in the photographic and rayon arts or, for that matter, in the lacquer industry where the lacquer is to be used clear. This is due to the fact that the film obtained from such a cellulose acetate is generally of a slightly yellow or brown color which is objectionable particularly for thick films. To utilize this product it is often necessary to submit the hydrolyzed cellulose esters to a final bleaching operation.

An object of the present invention is to provide a process for the hydrolysis of cellulose esters. Another object is to conduct the hydrolysis of cellulose esters in the presence of a gaseous medium whereby the ester is simultaneously hydrolyzed and bleached. A further object is to effect a reduction in the viscosity of the cellulose acetate during its hydrolysis. Other objects will hereinafter appear.

We have found that the introduction of certain gases into the cellulose acetate solution before, during or after hydrolysis produces a whiter product which, when dissolved in a suitable solvent liquid, has a greater fluidity than the cellulose acetates or esters prepared by the usual processes. To produce the optimum results, it is necessary that the gaseous medium be present in the hydrolyzing bath throughout the period of hydrolysis although in some instances it will be evident that such a thorough conditioning of the cellulose acetate may not be required.

The gaseous mediums which we have found suitable for this purpose are the unsaturated hydro-carbons of the ethylene series, particularly ethylene, and also sulfur dioxide. These gases are suitable for use not only with the cellulose acetate, which at the present time is the organic ester of cellulose which is of the greatest importance from the commercial standpoint, but likewise are useful for the hydrolysis of other organic esters of cellulose, such for example, as cellulose formates, propionates, butyrates and like acyl esters of cellulose.

These gases may be added to the hydrolyzing bath in any one of a number of ways some of which will readily suggest themselves to those skilled in this art. For example, we have found it, in many instances, advantageous to dissolve the gas in a suitable liquid such as glacial acetic acid and then add the charged acid to the hydrolyzing bath. Other compatible solvents which will dissolve the gas and which are likewise amenable to the hydrolyzing bath may be used as a carrier of the gas. Or the gas may, if desired, be bubbled into the hydrolyzing bath by simply immersing therein a suitable tubing through which the gas is injected into and throughout the mass. Another method for its introduction may be the generation of the gas within the hydrolyzing mixture either by chemical or electrolytic action. The sulfur dioxide, for example, may be generated in situ by the action of the acetic acid solution on sulfites and bisulfites, the water soluble bisulfites such as sodium bisulfites being preferable. The use of such salts, however, are apt to inhibit the hydrolytic catalyst and it should be borne in mind that a correspondingly increased amount thereof should, therefore, be added to fully hydrolyze the ester. While the addition of sulfurous acid accomplishes much the same purpose as sulfur dioxide its use is much more limited than the direct absorption of sulfur dioxide by the solution since the solvent water in the sulfurous acid will markedly change the rate of hydrolysis of the cellulose ester.

While the gases named are generally added to the hydrolyzing bath at or about room temperature and atmospheric pressure the addition may be made at higher temperature and pressure if so desired in order that a greater concentration of the gas may be present in the hydrolyzing bath. While this somewhat increases the velocity of the reaction and also results in a greater increase in fluidity, when the resulting cellulose acetate is dissolved in a suitable solvent, we have found that such an expedient is not generally required.

The occlusion, however, in the solution of greater quantities of the gas increases the fluffiness of the cellulose ester when it is precipitated after hydrolysis and particularly so if the precipitating bath be heated to a temperature which rapidly releases the dissolved gas from solution. This advantageous result is likewise evident when carrying out the operations at room temperature and atmospheric pressure. The fluffing of the cellulose acetate by this action has many advantages as it renders the subsequent washing and later drying and re-dissolving of the ester more readily and quickly carried out.

The concentration of the gaseous medium in the bath will vary considerably with the type of the cellulose ester it is desired to obtain. If a cellulose ester of maximum fluidity and whiteness is sought a greater concentration of the gaseous medium should be used, although for most purposes the concentration as described in the following examples is satisfactory.

We shall now give several examples for carrying out our invention but it shall be distinctly understood that we are not limited by the proportions or other details therein given except as they are indicated in the appended claims.

*Example 1.*—Into 360 parts of cellulose acetate solution resulting from the acetylation of cellulose as prepared, for instance, by the process described in U. S. Patent 1,683,347 of H. Le B. Gray and C. J. Staud in which the excess of acetic anhydride has been destroyed with the requisite quantity of water and to which an excess of 20 parts of water have been added with two parts of concentrated hydrochloric acid (sp. g. 1.19) sulfur dioxide is bubbled as rapidly as it can be absorbed with thorough stirring for a period of 15 minutes. The gas is then shut off and 15 minutes after the hydrolysis has been under way for a period of approximately 10 hours, the whole solution is held at 40 to 45° C. for 6½ hours and finally for 16 hours at room temperature. Sulfur dioxide is again passed into the solution for 30 minutes just prior to the precipitation in water at a temperature of 40 to 60° C. Since a large volume of gas is dissolved in the solution on pouring in a fine stream into warm water a fluffy product is obtained which is readily washed free of acid. On comparing the acetone solution of this product with that of a product from a check run from the same preparation, but without the addition of sulfur dioxide, it was found that the gaseous treatment gave a much whiter solution with approximately ½ the viscosity of the cellulose acetate into which the sulfur dioxide had been passed.

*Example 2.*—600 parts of cellulose triacetate were prepared as described in the above example, to which 26 parts of water dissolved in 40 parts of glacial acetic acid may be added. Ethylene is then introduced through a suitable glass tube, drawn out to a small tip, from a tank of the compressed gas. During 30 minutes of treatment, 28 parts by weight of the gas is used. The resulting solution is then held at 38° C. After 95 hours an acetone soluble product is obtained which is precipitated in warm water. Since ethylene is not very appreciably soluble in water the cellulose acetate is precipitated in a finely divided fluffy form porous and filled with fine bubbles. This product is less colored and less viscous than the check product which was prepared without the addition of ethylene.

It is evident that various equivalents of the gases herein given with many changes in the concentration thereof or in the manner in which they are introduced into the hydrolyzing bath may be employed without departing from this invention or sacrificing any of its advantages.

What we claim as new and desire to be secured by Letters Patent of the United States is:

1. In the process for the preparation of an organic acid ester of cellulose the step which comprises hydrolyzing the cellulose ester in a bath containing sulfur dioxide.

2. In the process for the preparation of cellulose acetate the step which comprises hydrolyzing the cellulose acetate in a bath containing sulfur dioxide.

3. In the process for the preparation of cellulose acetate the step which comprises adding to the hydrolyzing bath an acetic acid solution containing sulfur dioxide.

4. In the process for the preparation of cellulose acetate the step which comprises hydrolyzing the cellulose acetate in an acetic acid bath saturated with sulfur dioxide.

5. In the process for the preparation of an organic acid ester of cellulose the step which comprises hydrolyzing the cellulose ester in a de-esterifying bath containing a compound having tetravalent sulfur and oxygen therein.

6. In the process for the preparation of an organic acid ester of cellulose the step which comprises hydrolyzing the cellulose ester in a de-esterifying bath containing a compound having a $SO_2$ radical.

7. In the process for the preparation of an organic acid ester of cellulose the step which comprises hydrolyzing the cellulose ester in a bath containing sulfurous acid.

8. In the process for the preparation of an organic acid ester of cellulose the step which comprises hydrolyzing the cellulose ester in a bath containing a sulfite.

9. In the process for the preparation of an organic acid ester of cellulose the step which comprises hydrolyzing the cellulose ester in a de-esterifying bath in which sulfur dioxide gas has been dissolved.

CHARLES S. WEBBER.
CYRIL J. STAUD.